(12) United States Patent
Arnold et al.

(10) Patent No.: US 6,694,507 B2
(45) Date of Patent: Feb. 17, 2004

(54) METHOD AND APPARATUS FOR ANALYZING PERFORMANCE OF OBJECT ORIENTED PROGRAMMING CODE

(75) Inventors: Jeremy Alan Arnold, Rochester, MN (US); Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 09/738,731

(22) Filed: Dec. 15, 2000

(65) Prior Publication Data

US 2002/0091995 A1 Jul. 11, 2002

(51) Int. Cl.[7] .................................................. G06F 9/44
(52) U.S. Cl. ...................... 717/108; 717/116; 717/114; 717/118; 717/128; 709/203; 709/315; 707/103 R; 707/103 Y
(58) Field of Search ................................. 717/127–131, 717/125, 135, 116, 118, 154, 128, 106, 108; 707/103 R, 103 Y, 206; 709/203, 315, 318, 332

(56) References Cited

U.S. PATENT DOCUMENTS

| | | | | |
|---|---|---|---|---|
| 4,885,717 A | * | 12/1989 | Beck et al. .................. | 717/125 |
| 5,291,593 A | * | 3/1994 | Abraham et al. ......... | 707/103 R |
| 5,832,270 A | * | 11/1998 | Laffra et al. ................ | 717/125 |
| 5,944,781 A | * | 8/1999 | Murray ........................ | 709/202 |
| 5,960,199 A | * | 9/1999 | Brodsky et al. ............ | 717/128 |
| 6,011,917 A | * | 1/2000 | Leymann et al. ........... | 717/104 |
| 6,131,185 A | * | 10/2000 | Coskun et al. .............. | 717/129 |
| 6,145,121 A | * | 11/2000 | Levy et al. .................. | 717/135 |
| 6,189,046 B1 | * | 2/2001 | Moore et al. ................ | 709/315 |
| 6,189,142 B1 | * | 2/2001 | Johnston et al. ............ | 717/125 |
| 6,298,475 B1 | * | 10/2001 | Alcorn ........................ | 717/118 |
| 6,317,869 B1 | * | 11/2001 | Adl-Tabatabai et al. .... | 717/132 |
| 6,351,843 B1 | * | 2/2002 | Berkley et al. ............. | 717/128 |
| 6,353,859 B1 | * | 3/2002 | McKeehan et al. ......... | 709/315 |
| 6,366,932 B1 | * | 4/2002 | Christenson ................ | 707/206 |
| 6,438,744 B2 | * | 8/2002 | Toutonghi et al. .......... | 717/137 |
| 6,463,581 B1 | * | 10/2002 | Bacon et al. ................ | 717/154 |
| 6,510,504 B2 | * | 1/2003 | Satyanarayanan ........... | 711/170 |
| 6,564,223 B1 | * | 5/2003 | Sexton et al. ........... | 707/103 Y |
| 6,567,818 B1 | * | 5/2003 | Frey et al. .............. | 707/103 R |
| 6,567,905 B2 | * | 5/2003 | Otis ............................ | 711/170 |
| 6,629,153 B1 | * | 9/2003 | Gupta et al. ................ | 709/316 |

OTHER PUBLICATIONS

Title: Quartz: a tool for tuning parallel program performance, author: Anderson et al, ACM, 1990.*
Title: Using key object opportunism to collect old objects, author: Barry Hayes, ACM, 1991.*
IBM Corporation, "Jinsight 1.2, Visualizing the execution of Java programs" (Various unnumbered pages on the World Wide Web, undated, printed Nov. 13, 2000).

* cited by examiner

*Primary Examiner*—Chameli Chaudhuridas
(74) *Attorney, Agent, or Firm*—Roy W. Truelson

(57) ABSTRACT

A performance analyzer for object-oriented programming code distinguishes between an object which is substantively used within the creating method, and one which is merely created in the creating method and passed back to a calling method. In the preferred embodiment, a trace record is generated when the object is first accessed, to indicate the method which caused the operation, but no trace record is generated on subsequent object accesses. The performance analyzer may parse the trace to determine whether an object access trace record occurred in the creating method, or in some other method. Preferably, the program being analyzed is written in Java, and the performance analyzer is an instrumented Java Virtual Machine (JVM), i.e., a JVM to which trace and/or other performance analytic capabilities are added.

20 Claims, 6 Drawing Sheets

| Event No. | Thread ID | Timestamp | Event Type | Addr | Information |
|---|---|---|---|---|---|
| 1 | A | 00:00:01 | Method Entry | ABC | CallCount.main() |
| 2 | A | 00:00:02 | Method Entry | DEF | CallCount.callCountAsString() |
| 3 | A | 00:00:03 | Method Entry | GHI | Integer.toString() |
| 4 | A | 00:00:04 | ObjectCreate | XYZ | String |
| 5 | A | 00:00:05 | Method Entry | JKL | String constructor (char[], int,int) |
| 6 | A | 00:00:06 | Method Exit | JKL | String constructor (char[], int,int) |
| 7 | A | 00:00:07 | Method Exit | GHI | Integer.toString() |
| 8 | A | 00:00:08 | Method Exit | DEF | CallCount.callCountAsString() |
| 9 | A | 00:00:09 | Object Access | XYZ | String |
| 10 | A | 00:00:10 | Method Exit | ABC | CallCount.main() |

```
public class CallCount{ private int count = 0;

public synchronized void updateCount(){
        count++;
} public synchronized String callCountAsString(){
        return (Integer.toString(count));
} public static void main(String[]args){
        CallCount cc = new CallCount();
        cc.updateCount();
        String s = cc.callCountAsString();
        System.out.println(s);
}
}
```

FIG. 6

METHOD AND APPARATUS FOR ANALYZING PERFORMANCE OF OBJECT ORIENTED PROGRAMMING CODE

FIELD OF THE INVENTION

The present invention relates to digital data processing systems, and in particular to performance analysis of computer programming code.

BACKGROUND OF THE INVENTION

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the Microsoft Windows operating system, and under the control of the operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

Various programming languages have been developed to support the object oriented programming approach. The JAVA programming language developed by Sun Microsystems is one modern object oriented programming language that has become very popular in recent years. From a programmer's point of view, one of the advantages of the JAVA programming language is that memory allocation and reclamation are handled entirely by the run-time system, which relieves the programmer of the burden of determining how and when to destroy unneeded objects. All objects (other than those of primitive types) are allocated from a common "heap", or section of memory. The garbage collection mechanism then monitors the objects in the heap, and periodically deletes unneeded objects, thereby reclaiming portions of the heap that are occupied by objects that can no longer be accessed from the user's program.

One problem with the JAVA automatic allocation and reclamation of memory is that users have less control over their program's performance. Each time an object is allocated, a certain cost is incurred as the memory manager updates its data structures. Furthermore, an additional cost must be paid to reclaim the object during garbage collection. Although these costs are small when considered individually, the sheer frequency of object allocation and reclamation result in a significant portion of program execution time being spent in the memory manager, allocating and reclaiming memory for objects.

This problem is further compounded by the fact that it is difficult for a programmer to know how many objects are being created by a program. One of the pervasive concepts of object oriented programming is encapsulation. Encapsulation means that the internal structure and methods of reusable objects are hidden. Programmers are intended to access a reusable object via a defined interface, without concerning themselves with what goes on inside. Using the interface in accordance with its definition ensures that the program will behave in a predictable manner. But it does not assure any particular level of performance. With the internal details hidden, a programmer calling a method does not necessarily know what the performance consequences of that call might be, and in particular, does not know how many objects will be created as a result of the call.

As a result of these and other considerations, it has often been observed that a program written in an object oriented language and using reusable objects executes in a disappointingly slow manner, and in particular, executes more slowly than one would expect of a similar function written in a more traditional procedural language. Considerable research has therefore been directed to improving the performance of object oriented programs. For example, efforts have been made to design more intelligent compilers, which can identify common inefficiencies in object oriented source code and perform optimizations in the compiled code which avoid them.

Among the tools available to programmers and researchers are performance analyzers which monitor the execution of an object oriented program in order to identify bottlenecks. Typically, a performance analyzer has the capability to trace certain events which are considered significant to analyzing performance and program flow, such as the calling of a procedure or method, the occurrence of an exception condition, and the like. Since it is known that the creation of an object imposes a certain performance penalty, some conventional performance analyzers have the capability to trace the creation of objects in an object oriented program. I.e, these tools can identify each object creation event, and the method which caused an object to be created.

While conventional performance tools provide considerable assistance to programmers and researchers, there are many instances where the information provided could be improved. Although object creation imposes a performance penalty, the mere fact that a particular method created the object is often not very useful information. Many methods create, manipulate and store objects within the method. But it is also common in object oriented programming to write special methods for object creation, which typically create the object and initialize it to some default state, without doing anything more. In this case it is usual that any time an object of a class X is created, the same method (e.g. Cheate X) does so. A need exists, which is not necessarily recognized, to provide the programmer with more useful information concerning object creation.

SUMMARY OF THE INVENTION

In accordance with the present invention, a performance analyzer for object-oriented programming code distinguishes between different types of object uses. Specifically, a performance analyzer distinguishes between an object which is substantively used within the creating method, and one which is merely created in the creating method and passed back to a calling method.

In the preferred embodiment, a trace record is generated when the object is first used in some meaningful manner, to indicate the method which caused the operation. Preferably, an object is deemed first used when it is first "accessed", meaning that certain method calls are made on the object or certain fields read.

In the preferred embodiment, an additional bit is added to each object's header, which indicates whether the object has been accessed. When the object is first created a normal object create trace record is generated and the bit is cleared. When the object is first accessed, the bit is set and an object access trace record is generated. A subsequent object access (i.e., after the bit is set) does not cause a corresponding object access trace record to be generated.

In one embodiment, the performance analyzer may parse the trace to determine whether an object access trace record occurred in the creating method, or in some other method. The performance analyzer will treat the two cases differently. For example, it may delete object access trace records in the creating method, or it may omit them from certain statistical compilations.

Preferably, the program being analyzed is written in JAVA, and the performance analyzer is an instrumented JAVA Virtual Machine (JVM), i.e., a JVM to which trace and/or other performance analytic capabilities are added, potentially expanding the size of the object header to accommodate performance data.

By identifying the method in which an object is first accessed as explained above, the programmer is offered more useful analytical information. If the object is first accessed in a method other than the creating method, then it can be inferred that the creating method is a mere agent which is not the underlying cause of the object creation. If this first accessing method appears to be responsible for creating too many objects, the programmer may wish to modify the method to reduce the number of objects that must be created.

The details of the present invention, both as to its structure and operation, can best be understood in reference to the accompanying drawings, in which like reference numerals refer to like parts, and in which:

DESCRIPTION OF THE DRAWING

FIG. 4 illustrates a portion of a trace record, according to the preferred embodiment.

FIG. 6 illustrates an example of a simple segment of JAVA code for which object creation analysis in accordance with the preferred embodiment may be useful.

DETAILED DESCRIPTION OF THE PREFERRED EMBODIMENT

Overview

Figure 1:
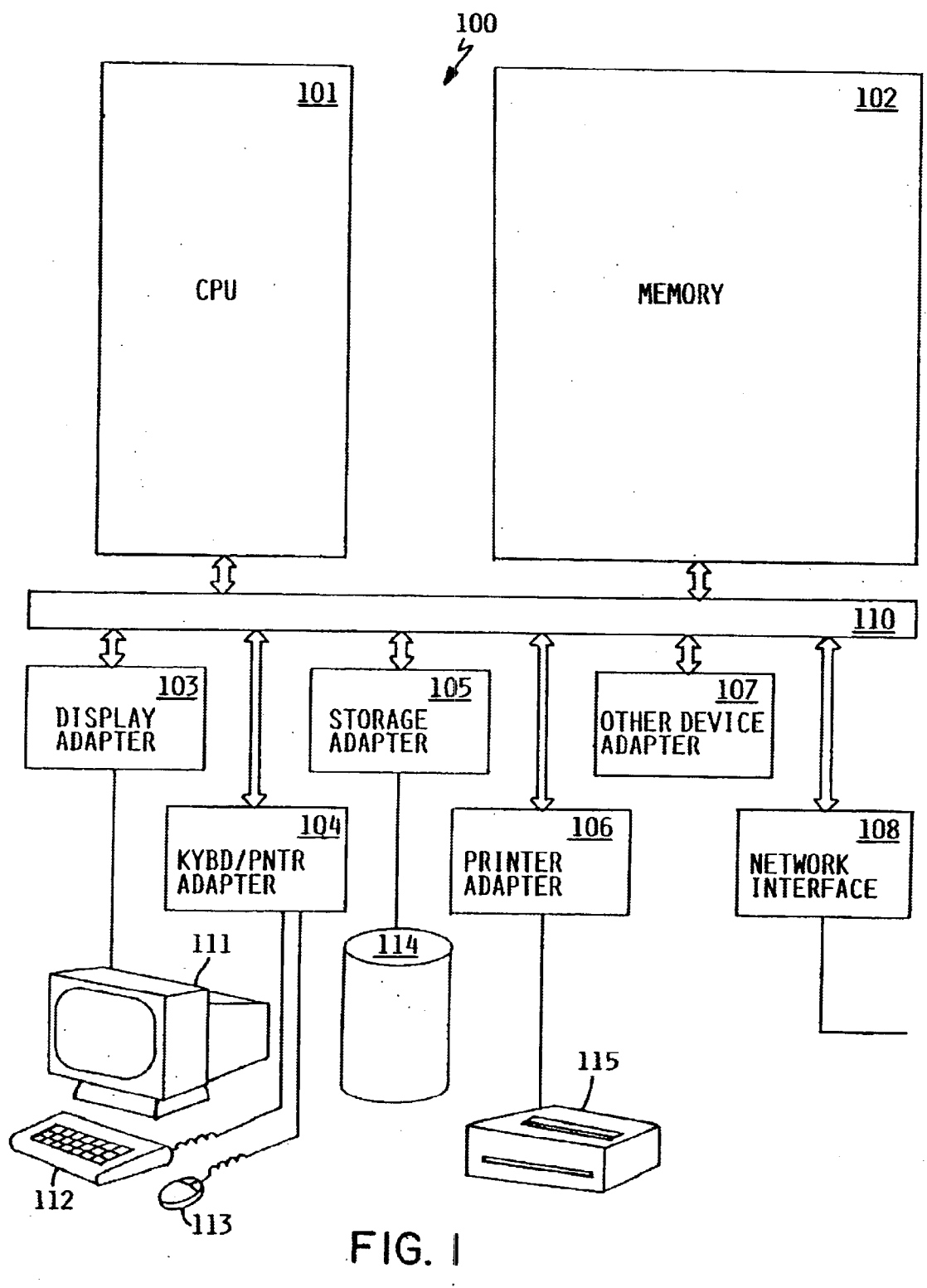
FIG. 1 is a high-level block diagram of a computer system for analyzing object oriented programming code, according to the preferred embodiment of the present invention.

The present invention relates to object oriented programming techniques. For those individuals who are not generally familiar with object oriented programming, the Overview section below presents many of the concepts that will help to understand the invention.

Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code that provides one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requester of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object" in another location, which may be a remote location. The client object—server object interactions form the basis for the distributed object system.

Another central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code. Each class has corresponding configuration data that determines the features or attributes of the class. Changing the configuration data for a class changes the existing class to a new class.

There are many computer languages that currently support object oriented programming techniques. For example, Smalltalk, Object Pascal, C++ and JAVA are all examples of programming languages that support object oriented programming to one degree or another.

JAVA Programming Language

JAVA is a modern object oriented programming language designed by Sun Microsystems that has grown in popularity in recent years. Java offers many features and advantages that makes it a desirable programming language to use. Java is completely platform independent. A JAVA program can be written once and can then run on any type of platform that contains a JAVA Virtual Machine (JVM). The JVM model is supported by most computer vendors, thereby allowing a software vendor to have access to hardware and software systems produced by many different companies. JAVA is an object oriented language, meaning that software written in Java can take advantage of the benefits of object oriented programming techniques. As in other object oriented systems, operations in JAVA are performed by one object calling a method on another object.

JAVA supports platform independence by defining an intermediate language form, known as JAVA "bytecodes". JAVA bytecodes are produced by passing human readable Java source code through a Java front-end compiler. This front-end compiler parses the source to produce a standardized bytecode form of instructions. Like the source code, the Java bytecode form of a program is platform independent. However, the bytecode form is not object code, in the sense that it is directly machine executable. The bytecode form is executed by a JVM, which is in reality either a compiler or interpreter specific to a particular computer system, which receives bytecode form as input and produces machine-specific executable code.

A common programming technique in Java and many other object oriented languages is to create objects of certain classes using special object creation methods. Typically, each such method creates a single instance of an object when called and initializes certain object attributes to default values. Default values may be fixed values, or may be determined at run time according to some algorithm. Naturally, a separate such method with corresponding default values must be defined for each class. It is expected that such a method may be called from many different unrelated methods. The advantage of this programming technique is that it is not necessary for each method which requires an instance of an object to know how to determine all the default values, or to even know all the object attributes.

Analytical Tools for Java

A price for JAVA's platform independence and object oriented approach is often poor performance. It is known that a performance penalty is associated with object creation and subsequent garbage collection.

Because Java defines a bytecode intermediate form, but does not define the platform specific data structures, each JVM may form its own internal definition of an object data structure, i.e., may define the exact address location of each object field (attribute), the format of the object header, the format of arrays, strings or other complex data, etc. A performance analytic tool for Java may itself be a JVM, to which various extensions, such as data structures and functional capabilities, are added to track the performance of a JAVA program. This is referred to as an "instrumented" JVM. Among these extensions may be the addition of performance tracking data to the header of each object. An example of such an instrumented JVM product is IBM Corporation's Jinsight.

Jinsight is a tool for visualizing how Java programs execute. It is useful for performance analysis, debugging, and any task in which the programmer needs to better understand what a Java program is really doing. It shows object population, method invocations, garbage collection, CPU and memory bottlenecks, thread interactions, and object references. Among the capabilities of Jinsight is the capability to generate a trace of program execution, recording significant events. Jinsight can then visualize trace date, i.e., display results of trace data using any of various formatting techniques to aid in understanding.

Present analytical tools such as Jinsight have the capability to record various events in the trace records, but it is difficult to determine from these records the cause of certain performance problems, and in particular, difficult to determine the cause of object creation. I.e., the tool may generate a trace record when an object is created, from which it can be determined which method created the object. But as explained previously, because many objects are created by special object creation methods which merely create an object at the request of another method, this information is not necessarily very useful. The preferred embodiment of the present invention described below improves on the tracing capability of tools such as Jinsight by distinguishing between methods which create objects for their own use, and methods which merely create objects at the request of other methods. In the latter case, the method which ultimately caused the object creation is hopefully identified as the "responsible" method. The details of the preferred embodiment are described below.

DETAILED DESCRIPTION

An apparatus and method in accordance with the preferred embodiment provides an improvement to the existing analytical tools by heuristically determining whether an object is created for use by the creating method, or for use by another method, and in the latter case, identifies the "responsible" method. The latter is typically the case when a special object creation method, often known as a "factory method", is used to create and initialize the object to default attributes, although it should be understood that the present invention is not limited solely to identifying situations arising from the use of factory methods. While no perfect algorithm exists for identifying the method "responsible" for causing an object to be created, in accordance with the preferred embodiment, the method which first accesses an object after its creation is identified as the most likely cause of the object creation. By generating a trace record when an object is created, and generating a second trace record when an object is first accessed, one can record methods which are deemed responsible for object creation.

In general, "accessing" can be thought of as calling a method on an object or reading an internal field. In the preferred embodiment, it has a very specific meaning. In the preferred embodiment, the JAVA language is being used, and an object is accessed if: (a) a method is called on it via the invokevirtual, invokeinterface, or invokespecial bytecodes (except that an invokespecial bytecode used as a constructor of an object is not considered an access); or (b) the getfield bytecode is used on the object; or (c) the object is an array object, and any one of the iaload, laload, faload, daload aaload, baload, caload or saload bytcodes is used on the object.

Preferably, the invokestatic and getstatic bytecodes are not considered accesses because they don't need an object instance to be used and they don't modify the object if called on an instance. The invokevirtual, invokeinterface, and invokespecial bytecodes are not considered accesses if the object is passed in as a parameter because it might not actually be used in the method called. The astore, aastore, and astore_<n> bytecodes are not considered accesses because they are storing the object to a local variable, which may or may not be later accessed in the method. The putfield bytcode is not considered an access because it is modifying the object, but the object's existing information is not being accessed. The {i,l,f,d,a,b,c,s}astore bytcodes (i.e., iastore, lastore, fastore, etc) are treated similarly to putfield. The aload bytecode is not considered an access because it is loading the object into a local variable, but not actually using it yet.

Depending on use, one could optionally count putfield and {i,l,f,d,a,b,c,s}astore bytecodes as accesses. One could also optionally count invokevirtual, invokeinterface, or invokespecial, where the object is passed in as a parameter, as accesses. This capability may be useful, e.g., where the programmer wishes to see where an as-of-yet unaccessed object is updated or passed to another method without being "accessed" according to the more narrow usage of the preferred embodiment. It will be understood that it would alternatively be possible to use variations of the above sets of events as indicative of object access, and that in a programming language other than Java, it would be necessary to construct a different set of events, since these bytecodes are Java specific.

Referring to the Drawing, wherein like numbers denote like parts throughout the several views, FIG. 1 is a high-level block diagram of a typical computer system 100, which may be used to support a JAVA Virtual Machine (JVM) and analyze execution of a Java program, according to the preferred embodiment. Computer system 100 includes CPU 101, main memory 102, various device adapters and interfaces 103–108, and communications bus 110. CPU 101 is a general-purpose programmable processor, executing instructions stored in memory 102; while a single CPU is shown in FIG. 1, it should be understood that computer systems having multiple CPUs could be used. Memory 102 is a random-access semiconductor memory for storing data and programs; memory is shown conceptually as a single monolithic entity, it being understood that memory is often arranged in a hierarchy of caches and other memory devices. Communications bus 110 supports transfer of data, commands and other information between different devices; while shown in simplified form as a single bus, it may be structured as multiple buses, and may be arranged in a hierarchical form. Display adapter 103 supports video display 111, which is typically a cathode-ray tube display, although other display technologies may be used. Keyboard/pointer adapter 104 supports keyboard 112 and pointing device 113, depicted as a mouse, it being understood that other forms of input devices could be used. Storage adapter 105 supports one or more data storage devices 114, which are typically rotating magnetic hard disk drives, although other data storage devices could be used. Printer adapter 106 supports printer 115. Other device adapter 107 may support any variety of additional I/O devices, such as communications adapters, optical readers, magnetic readers, transceivers, etc. Network interface 108 provides a physical interface to a computer network, such as the Internet, or a local area network. System 100 might alternatively be connected to a larger "mainframe" computer system through a mainframe terminal channel interface.

The representation of FIG. 1 is intended as an exemplary simplified representation, it being understood that many variations in system configuration are possible in addition to those mentioned here. The number and type of attached devices may vary considerably. Computer system 100 is portrayed in FIG. 1 as any of various models of single-user computer systems known as "personal computers"; however, the methods and apparatus described herein for analyzing object-oriented programming code could be implemented in different environments, and functions could be distributed among different computer systems or system components. For example, multiple interactive workstations could be attached to a mainframe computer system, the mainframe storing data and/or analytical programs, and the workstations being used to provide a user interface. Alternatively, the present invention could be implemented using a client-server model in which servers store data or perform certain tasks on behalf of requesting clients. Furthermore, a system for analyzing object-oriented programs in accordance with the present invention may be a notebook or laptop computer, a special-purpose device, or any of various hardware variations.

Figure 2:
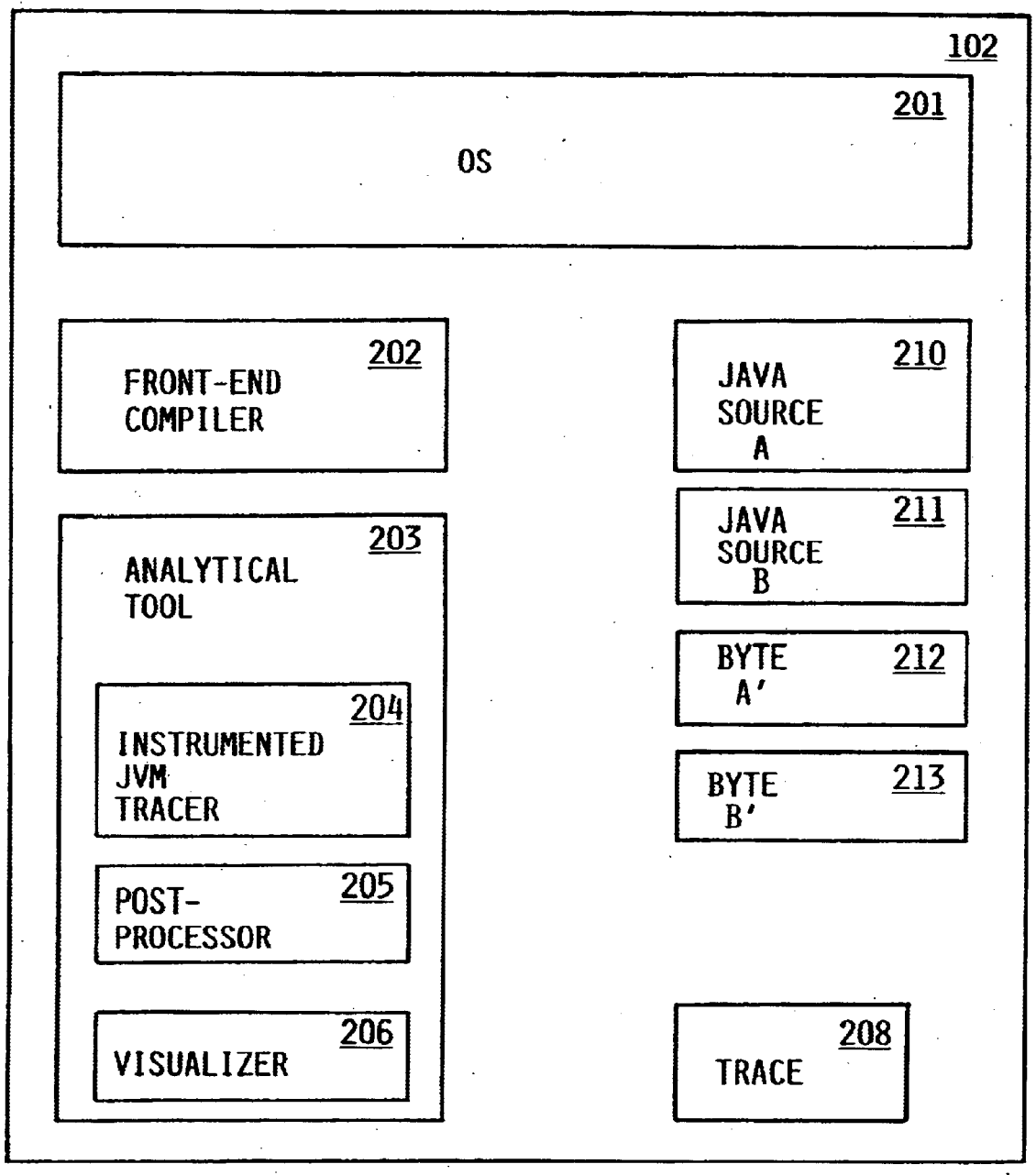
FIG. 2 is a conceptual illustration of the major software components of the computer system, according to the preferred embodiment.

FIG. 2 is a conceptual illustration of the major software components of computer system 100 in memory 102. Operating system 201 provides various low-level software functions, such as device interfaces, management of memory pages, management of windowing interfaces, management of multiple tasks, etc. as is well-known in the art. JAVA front-end compiler 202 is a program which converts a human readable JAVA source code file to a JAVA bytecode form (intermediate, machine-independent form), outputting a JAVA bytecode file. Analytical tool 203 is preferably a multi-function tool for analyzing JAVA programming code. Among the functions included in analytical tool 203 is a tracer 204 which is implemented as an instrumented JVM for executing JAVA programs in bytecode form, and tracing certain events occurring during execution, as more particularly described herein. Analytical tool 203 further includes a trace post-processor 205 which processes trace data after collection to identify certain conditions, as more particularly described herein, and visualizer 206, which manipulates and presents trace data to the user in any of various user specified formats.

JAVA source code files 210–211 are files containing human readable JAVA source code which may be input to front-end compiler 202. JAVA source code files may be imported or downloaded from another computer system, or may be generated in system 100 using any of various conventional code editors (not shown). JAVA bytecode files 212–213 are files produced as output by front-end compiler 202, and which may execute and be traced by instrumented JVM tracer 204. While JAVA source files 210–211 and Java front-end compiler 202 are shown in FIG. 2 for illustrative purposes, it will be understood that these may exist on different computer systems and that Java bytecode files 212–213 may be imported from these other systems for execution and analysis on system 100. Trace file 208 is a dump of trace data collected during an execution of a JAVA bytecode program by JVM tracer 204. Memory 102 may contain various additional applications and associated data files for performing useful work, which are not shown in FIG. 2. These applications may include, e.g., word processing, spreadsheet, electronic calendar, accounting, graphics, computer code development, or any of thousands of other possible applications.

While a certain number of applications, files or other entities are shown in FIG. 2, it will be understood that these are shown for purposes of illustration only, and that the actual number and type of such entities may vary. Additionally, while the software components of FIG. 2 are shown conceptually as residing in memory, it will be understood that in general the memory of a computer system will be too small to hold all programs and data simultaneously, and that information is typically stored in data storage 114, comprising one or more mass storage devices such as rotating magnetic disk drives, and that the information is paged into memory by the operating system as required.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as storage device 114 and memory 102.

Figure 3:
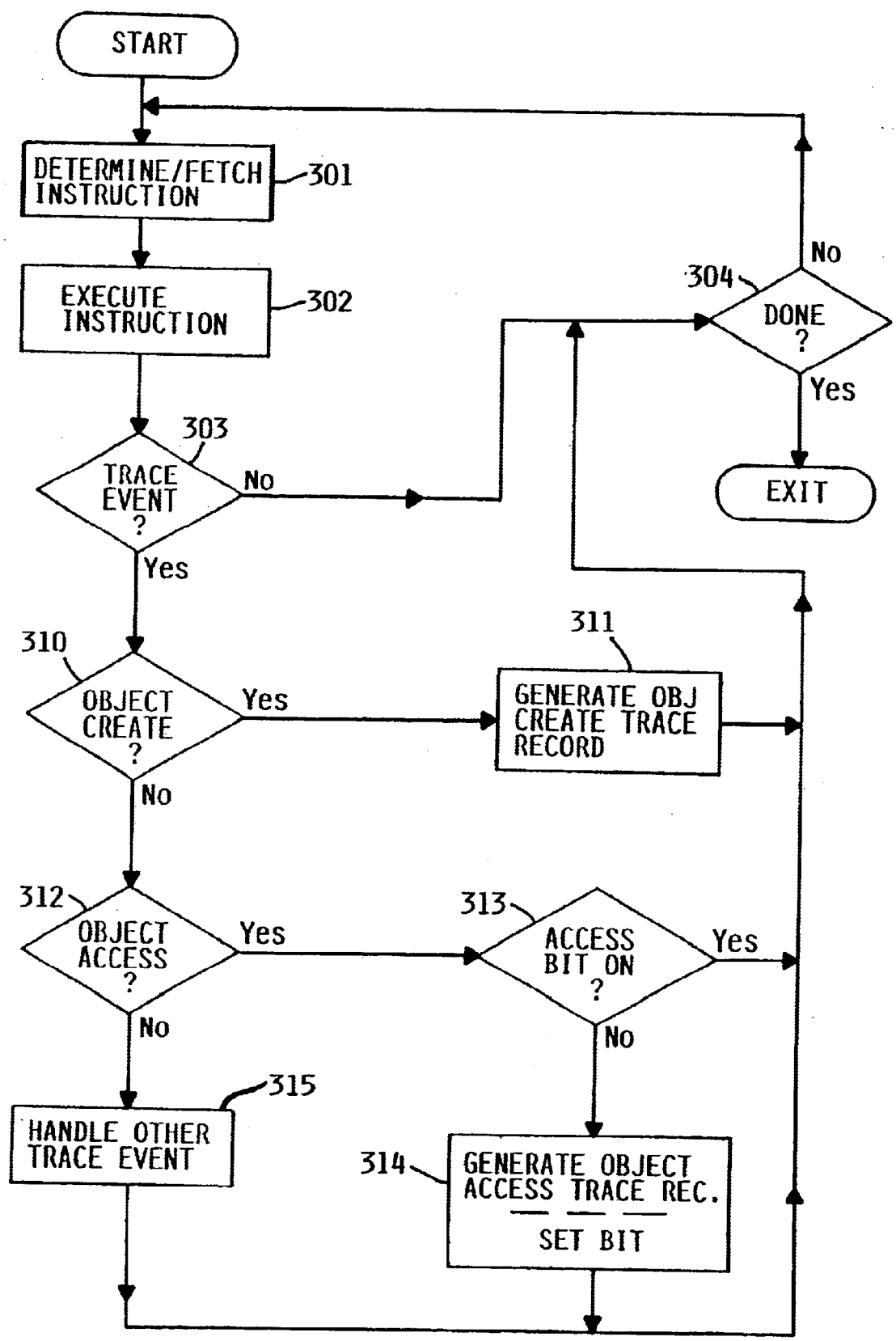
FIG. 3 is a high-level flow diagram of the operation of a trace application implemented as an instrumented JAVA Virtual Machine, according to the preferred embodiment.

FIG. 3 is a high-level flow diagram of the operation of tracer 204, according to the preferred embodiment. Tracer 204 is preferably an instrumented JAVA Virtual Machine (JVM) which executes JAVA bytecode programs and generates trace records upon the occurrence during program execution of certain pre-defined events. However, it will be understood that it would alternatively be possible to include tracing capability as described herein in a compiler which would generate machine-specific object code from JAVA bytecodes or some other source. As shown in FIG. 3, upon being invoked, tracer 204 performs a fetch-execute cycle until a program exit condition is reached. This is indicated at a conceptual level as step 301, in which the next instruction is determined (which may involve branching) and fetched, and step 302, in which the instruction is executed, it being understood that certain parts of the fetch-execute cycle may be performed concurrently. At step 303, the tracer determines whether a trace event has occurred as a result of executing the current instruction. If not, the tracer proceeds to step 304, determining whether an exit condition occurred. If an exit condition occurred, program execution terminates; otherwise the tracer repeats the fetch-execute cycle.

If a trace event occurred at step 303, then the tracer must determine the nature of the trace event and, where appropriate, output a trace record to trace file 208. If the relevant event was the creation of an object (step 310), the tracer generates an appropriate object create trace record and outputs this record to the trace file (step 311).

If the relevant event was an object access as defined previously (step 312), the tracer then determines whether the access bit in the object header is on (step 313). The access bit is cleared when the object is created, and set after the first access. If the access bit is on, then the current instruction which caused an object access is not the first time the object in question has been accessed. In this case, the "Y" branch is taken from step 313, and no trace record is generated. If the access bit is off, the "N" branch is taken from step 313, and the tracer generates an object access trace record, adding it to trace file 208 (step 314). The tracer also sets the access bit so that subsequent accesses to the same object will not cause trace records to be generated.

If the trace event was neither an object create nor an object access, then the "N" branch is taken from step 312, and the tracer handles the other trace event as appropriate (step 315). Other trace events may, e.g., be the invocation of a method, the return from a method, an exception condition, etc. Generally, this means that the tracer generates and outputs an appropriate trace record to trace file 208, although there might be additional processing associated with handling the other trace event.

However the trace event is handled (steps 310–315), the tracer returns to step 304 when finished handling the trace event, and resumes the fetch-execute cycle described earlier.

FIG. 4 illustrates a portion of a trace record 208 produced by tracer 204 during execution of a JAVA program. The trace record in the example of FIG. 4 is a trace produced by executing the Java code example of FIG. 6. As shown in FIG. 4, the trace contains multiple sequential entries, each having a thread identifier identifying the program thread which caused the trace event, a timestamp, an event type identifying the type of trace event which caused the trace entry to be generated, an address which can be used to identify specific object instantiations, and an information field which can be used to identify an entity associated with the event. Additional fields may be included in the trace record, but the fields shown in FIG. 4 are sufficient for purposes of illustration herein.

In the example of FIG. 4, it can be seen that the method CallCount.main( ) is first called, and that all the entries between 1 and 9 are generated while in this method (or in another nested method called by this method). At entry 2, a nested method CallCount.callCountAsString( ) is called, and at entry 3 another nested method Integer.toString( ) is called. At entry 4, an instantiation of object String is created. At entry 5, another nested method String constructor (char[ ],int,int) is called. The program thread then exits the three most recently called methods at entries 6–8, meaning that the program is in method CallCount.main( ). At entry 9, an instantiation of object String is first accessed. By comparing the address fields in entries 4 and 9, we can observe that the object instantiations are the same, i.e., the object instantiation created as event #4 is the same as the object instantiation accessed as event #9, and that in this case the object is accessed in a method other than the method (Integer.toString( )) which created it. At entry 10, the program thread exits method CallCount.main( ).

Figure 5:
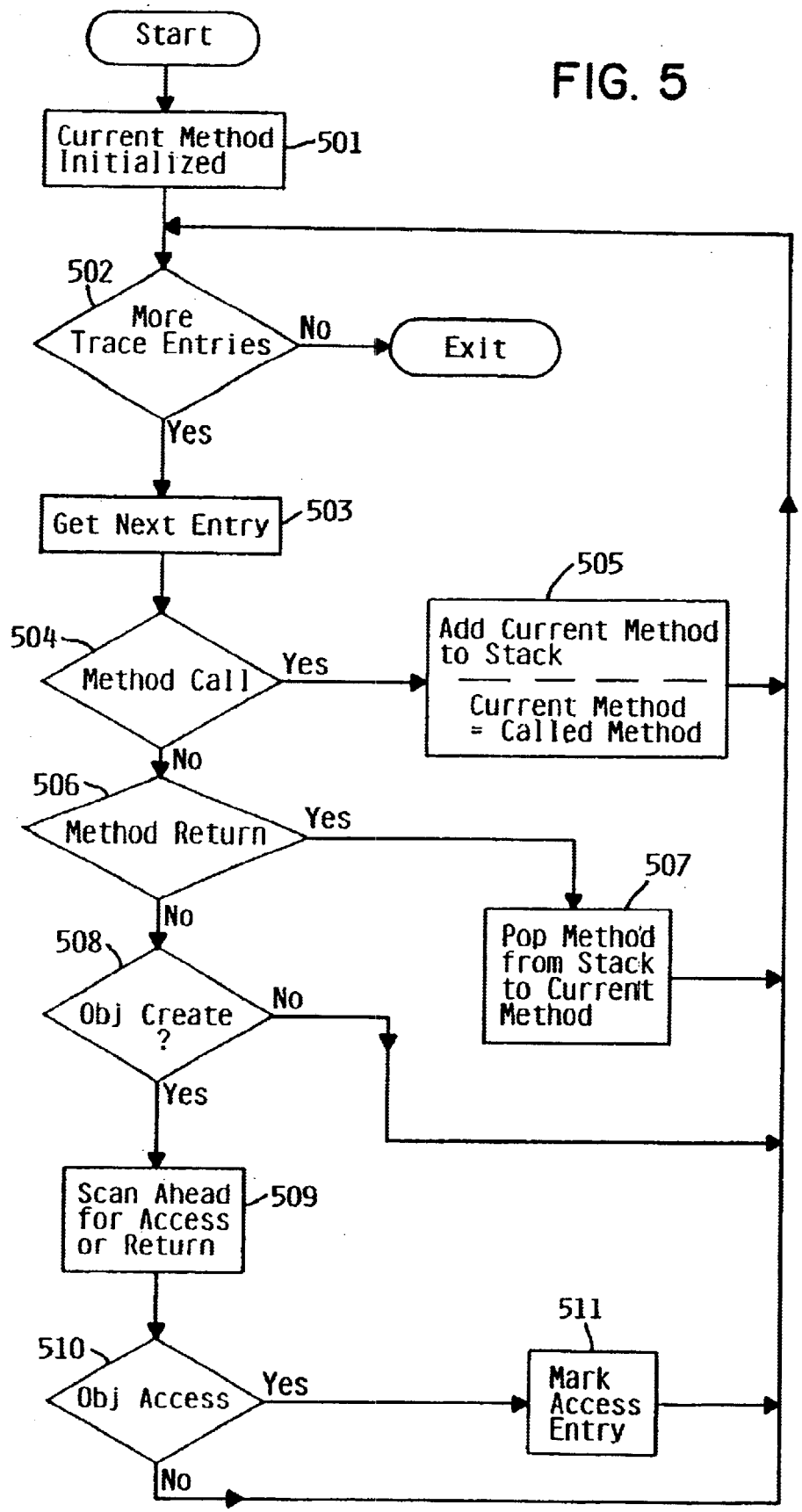
FIG. 5 is a high-level flow diagram of the operation of a post-processor which reviews accumulated trace data to identify different types of object accesses, in accordance with the preferred embodiment.

FIG. 5 illustrates the steps which may be performed by post-processor 205 to distinguish between objects which are first accessed in the creating method, and objects which are first accessed elsewhere. The post-processor initializes and sets the "current method" to the method which is the entry point, which is typically, but not always, the main method (step 501). It then scans the entries in trace file 208 sequentially, i.e. at step 502 it checks for another entry, and at step 503 gets and parses the next entry in the trace file. If the entry is a method call (step 504), the post-processor puts the current method on the top of a stack, and sets the current method variable to the value of the method just called (step 505). If the entry is a return from a method (step 506), the element on top of the stack is popped from the stack and its value loaded into the current method (step 507). In either case, after adjusting the value of the current method, the post-processor continues to step 502 to get the next entry. By these means, the post-processor keeps track of its position in nested method calls in much the same manner as an executing program would.

If the trace entry being processed is neither a method call nor a method return, the "N" branch is taken from step 506. In this case, the post-processor checks to see whether the entry is an object create entry (step 508). If not, nothing further is done at this stage, and the post-processor continues to step 502 to get another entry. If the entry is an object create, the post-processor scans ahead for an object access to the object that was created by the object create or a return from the current method (step 509). If the object access is found first (the "Y" branch from step 510), it is marked (step 511). Marking the object access entry indicates that the object access occurred in the creating method (or in a method nested within the creating method). If a return from the current method is found first (the "N" branch from step 510), nothing is marked. In either case, the post-processor returns to step 502 to scan for the trace entry.

If, at step 502, there are no more trace entries, then the post processor is done.

The net effect of post processing as described above is that object access entries occurring in the creating method will be marked, while those occurring in another method will not, thus distinguishing the two.

The trace record thus processed may be presented to the programmer using visualizer 206 in any of various conventional formats. The programmer may wish to see all marked and unmarked object access records, or may wish to see only unmarked object access records, in which case visualizer 206 may hide any marked records. Additionally, visualizer 206 may generate statistics and graphs using object access records which indicate the method in which an object was first accessed.

FIG. 6 illustrates an example of a simple segment of JAVA code for which it may be useful to identify the "cause" of object creation, as opposed to merely identifying the method which creates an object. In this example, an application might use the class CallCounter to output some type of status message to the user. If the status message gets updated every second with the current "call count", an object is created every second. By recognizing that the object create is really due to calling the method callCountAsString( ), the application could be modified to update the message on a less frequent basis (e.g., every 5 seconds), significantly reducing the number of objects being created.

In the preferred embodiment, a particular heuristic is used to infer that one method is the root cause of an object's creation, i.e., that the method which first accesses an object is the root cause. However, it will be understood that this heuristic is not necessarily perfect, and that other heuristics or algorithms could possibly be used to identify a method, other than the creating method, which is responsible for causing an object to be created.

In the preferred embodiment, a trace record is generated when an object is first accessed, whether or not it is accessed in the creating method. A post-processor then infers from the sequence of trace events whether the object was first accessed in the creating method or in another method, and distinguishes the two types of accesses in some manner. However, it will be understood that it would alternatively be possible to distinguish the two types of accesses at the time the trace record is generated. For example, a record of the creating method invocation may be kept in the object header, and the tracer may compare this with the current method invocation to determine whether the object is being first accessed in the creating method. This alternative may reduce the size of the trace record, but it is not preferred because it adds complexity to the run-time environment. As a second alternative, it would be possible to generate a trace record for all object accesses (or some broader class of object reference), and to delete or otherwise distinguish the accesses in the post-processor. E.g., all object accesses after the first access could be deleted, as well as the first access if it occurs in the creating method. This second alternative has the merit of simplicity of implementation in the tracer, but tends to generate an unnecessarily large number of trace records.

In the discussion above, the method and apparatus herein disclosed have been desired as applicable to the Java programming language, JAVA being a widely understood object-oriented language which is subject to the problems above described, specifically, high overhead associated with object creation, coupled with difficulty identifying the root cause of object creation. However, it will be understood that the present invention could be applied to other object-oriented programming languages having similar characteristics.

Although a specific embodiment of the invention has been disclosed along with certain alternatives, it will be recognized by those skilled in the art that additional variations in form and detail may be made within the scope of the following claims:

What is claimed is:

1. A method for analyzing object-oriented programming code, comprising the steps of:

monitoring the creation of objects during execution of said object-oriented programming code;

automatically determining, with respect to each object creation, whether a first method, said first method being a method which created the object, created the object for use by a second method;

automatically identifying said second method, with respect to each object creation for which said determining step determines that the object was created by the first method for use by the second method.

2. The method for analyzing object-oriented programming code of claim 1, wherein said step of determining whether a first method, said first method being a method which created the object, created the object for use by a second method comprises determining whether said first method accesses the object; and wherein said step of automatically identifying said second method comprises, if the object is not accessed by the first method, then generating a record identifying the method which first accesses the object.

3. The method for analyzing object-oriented programming of claim 1, wherein said object oriented programming code is written in the JAVA language.

4. The method for analyzing object-oriented programming of claim 1, further comprising generating a plurality of trace records recording events during execution of said object oriented programming code, said events including the creation of objects and the use of objects.

5. The method for analyzing object-oriented programming of claim 4, further comprising parsing said plurality of trace records to automatically determine whether a use of an object first occurs in the method which created the object, said parsing being performed after generating said plurality of trace records.

6. A method for analyzing object-oriented programming code, comprising the steps of:

monitoring the creation of objects during execution of said object-oriented programming code;

automatically determining, with respect to a use of an object by a method, whether the use is the first use of the object since creation of the object; and selectively generating a trace record responsive to the automatically determining step if said use of the object is the first use of the object since its creation, wherein no trace record is generated if the automatically determining step determines that said use of the object is not the first use of the object since its creation.

7. The method for analyzing object-oriented programming code of claim 6, wherein a respective data field in each object header is set to a first value when the corresponding object is created, and set to a second value when the corresponding object is first used, said step of automatically determining, with respect to a use of an object by a method, whether the use is the first use comprising examining the value of said data field.

8. The method for analyzing object-oriented programming code of claim 6, wherein said step of automatically determining, with respect to a use of an object by a method, whether the use is the first use comprises automatically determining, with respect to an access of the object, whether the access is the first access.

9. The method for analyzing object-oriented programming of claim 6, wherein said object oriented programming code is written in the JAVA language.

10. The method for analyzing object-oriented programming of claim 6, further comprising:

generating a plurality of trace records recording events during execution of said object oriented programming code, said events including the creation of objects and the use of objects; and parsing said plurality of trace records to automatically determine whether a use of an object first occurs in the method which created the object, said parsing being performed after generating said plurality of trace records.

11. A computer program product for analyzing object-oriented programming code, said computer program product comprising a plurality of computer executable instructions recorded on signal-bearing media, wherein said instructions, when executed by a computer, cause the computer to perform the steps of:

monitoring the creation of objects during execution of said object-oriented programming code;

automatically determining, with respect to each object creation, whether a first method, said first method being a method which created the object, created the object for use by a second method; and automatically identifying said second method, with respect to each object creation for which said determining step determines that the object was created by the first method for use by the second method.

12. The computer program product for analyzing object-oriented programming code of claim 11, wherein said step of determining whether a first method, said first method being a method which created the object, created the object for use by a second method comprises determining whether said first method accesses the object; and wherein said step of automatically identifying said second method comprises, if the object is not accessed by the first method, then generating a record identifying the method which first accesses the object.

13. The computer program product for analyzing object-oriented programming of claim 11, wherein said computer further performs the step of generating a plurality of trace records recording events during execution of said object oriented programming code, said events including the creation of objects and the use of objects.

14. The computer program product for analyzing object-oriented programming of claim 13, wherein said computer further performs the step of parsing said plurality of trace records to automatically determine whether a use of an object first occurs in the method which created the object, said parsing being performed after generating said plurality of trace records.

15. The computer program product for analyzing object-oriented programming of claim 11, wherein said computer program product is an instrumented JAVA Virtual Machine.

16. A computer program product for analyzing object-oriented programming code, said computer program product comprising a plurality of computer executable instructions recorded on signal-bearing media, wherein said instructions, when executed by a computer, cause the computer to perform the steps of:

monitoring the creation of objects during execution of said object-oriented programming code;

automatically determining, with respect to a use of an object by a method, whether the use is the first use of the object since creation of the object; and selectively generating a trace record responsive to the automatically determining step if said use of the object is the first use of the object since its creation, wherein no trace record is generated if the automatically determining step determines that said use of the object is not the first use of the object since its creation.

17. The computer program product for analyzing object-oriented programming code of claim 16,
   wherein a respective data field in each object header is set to a first value when the corresponding object is created, and set to a second value when the corresponding object is first used, said step of automatically determining, with respect to a use of an object by a method, whether the use is the first use comprising examining the value of said data field.

18. The computer program product for analyzing object-oriented programming code of claim 16,
   wherein said step of automatically determining, with respect to a use of an object by a method, whether the use is the first use comprises automatically determining, with respect to an access of the object, whether the access is the first access.

19. The computer program product for analyzing object-oriented programming of claim 16, further comprising:
   generating a plurality of trace records recording events during execution of said object oriented programming code, said events including the creation of objects and the use of objects; and
   parsing said plurality of trace records to automatically determine whether a use of an object first occurs in the method which created the object, said parsing being performed after generating said plurality of trace records.

20. The computer program product for analyzing object-oriented programming of claim 16, wherein said computer program product is an instrumented JAVA Virtual Machine.

* * * * *